(12) United States Patent
Chen

(10) Patent No.: US 9,878,437 B2
(45) Date of Patent: Jan. 30, 2018

(54) COATING STRUCTURE FOR FORMING A TOOL

(71) Applicant: Yi-Fu Chen, Taichung (TW)

(72) Inventor: Yi-Fu Chen, Taichung (TW)

( * ) Notice: Subject to any disclaimer, the term of this patent is extended or adjusted under 35 U.S.C. 154(b) by 278 days.

(21) Appl. No.: 14/863,454

(22) Filed: Sep. 24, 2015

(65) Prior Publication Data

US 2017/0087710 A1    Mar. 30, 2017

(51) Int. Cl.
   *B25G 1/10*    (2006.01)
   *B25B 13/46*   (2006.01)

(52) U.S. Cl.
   CPC ............ *B25G 1/105* (2013.01); *B25B 13/463* (2013.01)

(58) Field of Classification Search
   CPC . B25G 1/10; B25G 1/12; B25G 1/125; B25G 1/105; B25B 23/16; B25B 13/46
   See application file for complete search history.

(56) References Cited

U.S. PATENT DOCUMENTS

| | | | | |
|---|---|---|---|---|
| 4,123,953 A * | 11/1978 | Corbacho, Jr. | ....... | B25B 13/461 76/114 |
| 4,986,147 A * | 1/1991 | Cooper | ................ | B25B 13/461 16/431 |
| 5,626,061 A * | 5/1997 | Whitley | ................ | B25B 13/461 76/114 |
| 9,021,922 B2 * | 5/2015 | Lai | ........................ | B25B 13/46 81/60 |
| 2004/0194584 A1 * | 10/2004 | Ofentavsek | ........... | B25B 13/463 81/54 |
| 2005/0102810 A1 * | 5/2005 | Hu | ........................ | B25B 13/461 29/90.01 |
| 2012/0174716 A1 * | 7/2012 | Tsai | ........................ | B25B 13/461 81/60 |

* cited by examiner

*Primary Examiner* — David B Thomas
(74) *Attorney, Agent, or Firm* — Rosenberg, Klein & Lee

(57) ABSTRACT

A coating structure for forming a tool comprises a tool body and an outer coating layer. The tool body includes at least one base plate, an upper limiting plate, a lower limiting plate, a ratchet driving member, a stirring member, and at least one pin. The base plate has a handle portion and a driving portion which is connected with one end of the handle portion. An accommodating groove is arranged at the driving portion and received the ratchet driving member and the stirring member. The upper and lower limiting plates are stacked on the upper and lower surfaces of the driving portion respectively. The outer coating layer is covered the outer surfaces of the upper and lower limiting surfaces and the base plate for fastened so as to prevent the outer coating layer from sliding while in operation. The operating quality is efficiently increased and the cost is saved.

7 Claims, 9 Drawing Sheets

COATING STRUCTURE FOR FORMING A TOOL

BACKGROUND OF THE INVENTION

1. Field of the Invention

The present invention relates to a coating structure for forming a tool, and especially relates to the design of plate materials combined with each other to replace the complicated forging process. Furthermore, an outer coating layer is covered on an outer surface of a tool body by injection molding so as to save cost.

2. Description of Related Art

Since the wrench tool must take higher torque, the steel materials must be selected more expensive materials and made by the base materials with better rigidity so that the cost is much higher. In addition, the manufacturing process is the forging molding and further includes complicated processes, such as straightening, cutting, heating, and so on. For example, the raw material after heating must be cooled for forging molding and then machining, such as lathe turning, drilling, to form an outlook of the wrench body. After heating for reinforcing the structure, it must be polished so as to make the surface of the wrench (tool) smooth and then electroplated to prevent from rusting. The whole process is complicated and makes the cost too high.

Furthermore, since the wrench has various sizes, the prices may be different based on the sizes of the wrench. The smaller the size is, and the lower the price is. Although the manufacturing processes are the same for the tools with various sizes and the equipment is not different, the small-size tools may be set to use in the manufacturing process. However, the changes of the small-size tools may be expired cost which is hard to control. For example, when heating, the small-size tool is easy to deform due to small size and structure. And the small-size tools after heating may be deformed over an angular of 180 degree. Therefore, the straightening process is much longer or added at least one more and the cost is increased. Besides, since the small-size tools after heating cannot be hanged stably and are easy to be deformed, they are dropped and deposited at the bottom of the furnace to result in defect rate higher. Therefore, the cost is hard to control.

In order to solve above mentioned problems, unless the twisting load is influenced in operation, there is an outer covering shell is designed to cover on the outer surface of the wrench tool. The steel material cost may be decreased to cost down.

However, a larger gap may be formed by the manner of covering the outer covering shell on the outer surface of the wrench tool between the outer covering shell and the wrench tool. The outer covering shell is hard to firmly fasten to the wrench tool. The vibration and slide may be resulted while in operation. It is inconvenient.

In addition, the complicated processes, including straightening, cutting, heating, and forging after molding, are not changed and the cost is still high. The material cost which is decreased by covering the outer covering shell on the outer surface of the wrench tool is not efficiently obvious.

In view of the foregoing circumstances, the inventor has invested a lot of time to study the relevant knowledge, compare the pros and cons, research and develop related products. After quite many experiments and tests, the "coating structure for forming a tool" of this invention is eventually launched to improve the foregoing shortcomings, to meet the public use.

SUMMARY OF THE INVENTION

The disadvantages of the conventional tool structure are that the manufacturing cost is too high to efficiently decrease and the covering structure is worse fastened to result in problems in use. How to solve the disadvantages is the main purpose of the present invention.

An object of this invention is providing a coating structure for forming a tool. The coating layer is covered on the outer surface of the tool body by injection molding to fasten each other without gap to prevent the coating layer from sliding while in operation. It may increase the operation quality of the tool.

Another object of this invention is providing a coating structure for forming a tool. The steel forging process of the coating structure of the present invention, compared to general steel forging process, is much simpler so as to save cost.

In order to achieve above mentioned effects, a coating structure for forming a tool is provided. The coating structure may comprise a tool body and an outer coating layer, wherein: the tool body includes at least one base plate, an upper limiting plate, a lower limiting plate, a ratchet driving member, a stirring member, and at least one pin, the base plate has a handle portion and a driving portion connected with one end of the handle portion, an accommodating groove is arranged at the driving portion, the upper limiting plate is arranged at an upper surface of the driving portion and has an upper limiting hole, the lower limiting plate is arranged at a lower surface of the driving portion and has a lower limiting hole, the upper surface of the driving portion is arranged above the lower surface thereof and opposite to each other, the ratchet driving member is arranged at the accommodating groove and pivoted at the upper limiting hole and the lower limiting hole, the stirring member is arranged between the ratchet driving member and the handle portion to control a driving direction of the ratchet driving member, the at least one pin is inserted at a peripheral of the accommodating groove located at the driving portion and passing through the upper limiting plate and the lower limiting plate for fastening, and two ends of the at least one pin are respectively protruded from a surface of the upper limiting plate and a surface of the lower limiting plate; and the outer coating layer is covered at the surface of the upper limiting plate located at a peripheral of the upper limiting hole, the surface of the lower limiting plate located at a peripheral of the lower limiting hole, and an outer surface of the base plate, the coating layer is also covered on two ends of the at least one pin protruding the surface of the upper limiting plate and the surface of the lower limiting plate for fastening.

In some embodiments, two limiting convex portions are respectively arranged at two ends of the ratchet driving member in an axial direction, and the two limiting convex portions are respectively sleeved by the upper limiting hole and the lower limiting hole.

In some embodiments, a driving convex portion is arranged at the ratchet driving member and protruded from one end surface of the two limiting convex portions.

In some embodiments, a driving sleeving hole is passing through the ratchet driving member and the two limiting convex portions.

In some embodiments, a base material is injected to cover on an outer surface of the tool body to formed the outer coating layer by a plastic injection molding machine, and a handle end and an operating end are formed at the coating layer corresponding to the handle portion and the driving portion of the tool body respectively.

In some embodiments, the stirring member has a stirring portion, and the stirring portion is exposed to an outer surface of the upper limiting plate.

The various objectives and advantages of the present invention will be more readily understood from the following detailed description when read in conjunction with the appended drawing.

DETAILED DESCRIPTION OF THE INVENTION

Figure 1:
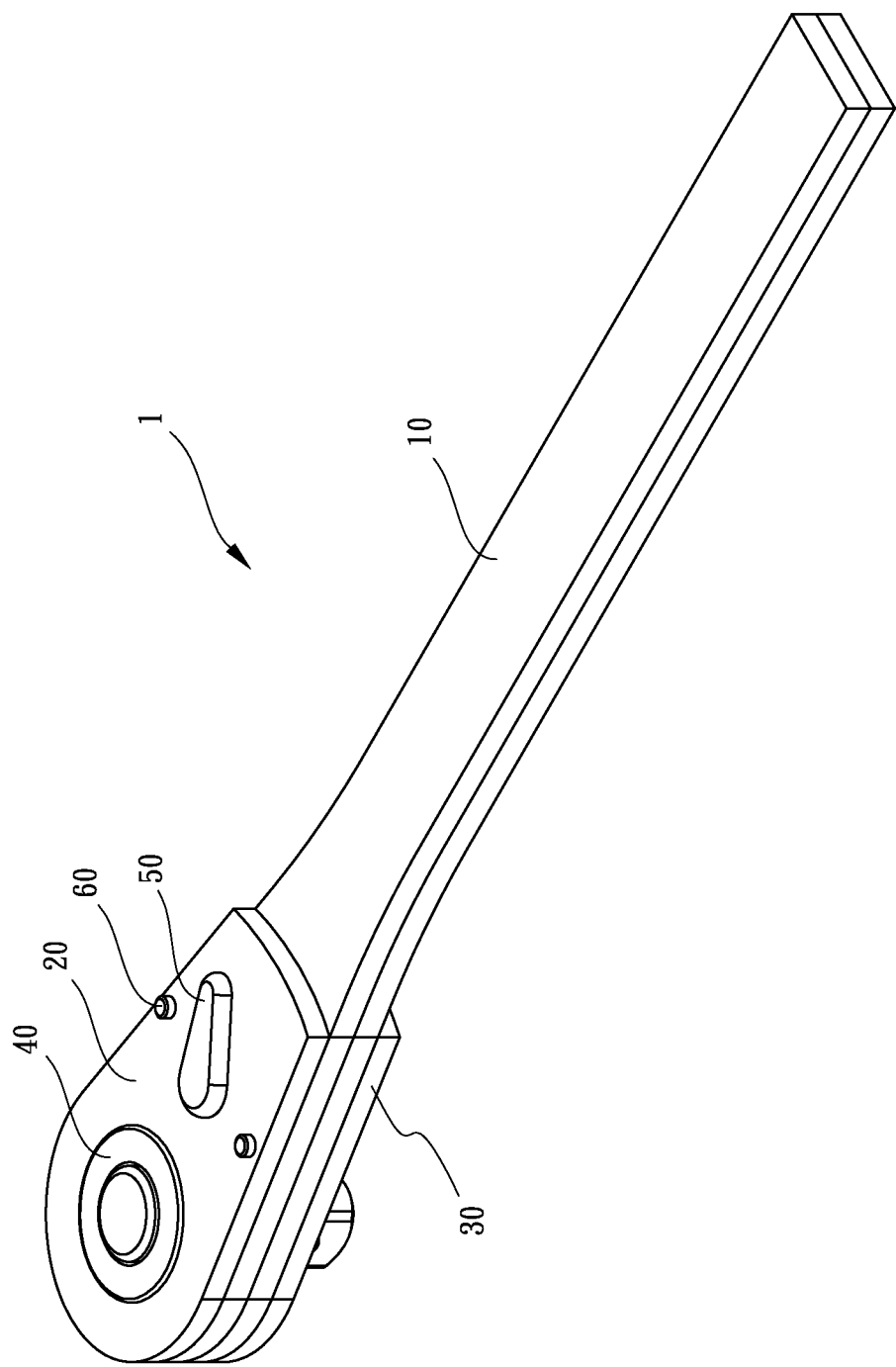
FIG. 1 is a perspective view of a coating structure for forming a tool of the present invention.

To describe clearly that the present invention achieves the foregoing objective and function, the technical features and desired function are described with reference to a preferred embodiment and accompanying drawings.

Please reference to FIGS. 1 to 5, a coating structure for forming a tool of the present invention may comprise a tool body 1 and an outer coating layer 2.

The tool body 1 may include at least one base plate 10, an upper limiting plate 20, a lower limiting plate 30, a ratchet driving member 40, a stirring member 50, and at least one pin 60. The base plate 10 has a handle portion 11 and a driving portion 12 which is connected with one end of the handle portion 11. An accommodating groove 13 is arranged at the driving portion 12. The upper limiting plate 20 is arranged at an upper surface of the driving portion 12 and has an upper limiting hole 21. The lower limiting plate 30 is arranged at a lower surface of the driving portion 12 and has a lower limiting hole 31. The upper surface of the driving portion 12 is arranged above the lower surface thereof and opposite to each other. The ratchet driving member 40 is arranged at the accommodating groove 13 and pivoted at the upper limiting hole 21 and the lower limiting hole 31. The stirring member 50 is arranged between the ratchet driving member 40 and the handle portion 1 to control a driving direction of the ratchet driving member 40. The at least one pin 60 is inserted at a peripheral of the accommodating groove 13 which is located at the driving portion 12 and passing through the upper limiting plate 20 and the lower limiting plate 30 for fastening. And two ends of the at least one pin 60 are respectively protruded from a surface of the upper limiting plate 20 and a surface of the lower limiting plate 30 (shown as in FIG. 2).

The outer coating layer 2 is covered at the surface of the upper limiting plate 20 which is located at a peripheral of the upper limiting hole 21, the surface of the lower limiting plate 30 which is located at a peripheral of the lower limiting hole 31, and an outer surface of the base plate 10. The coating layer 2 is also covered on two ends of the at least one pin 60 which protrude from the surface of the upper limiting plate 20 and the surface of the lower limiting plate 30 for fastening (shown as in FIG. 4).

Figure 2:
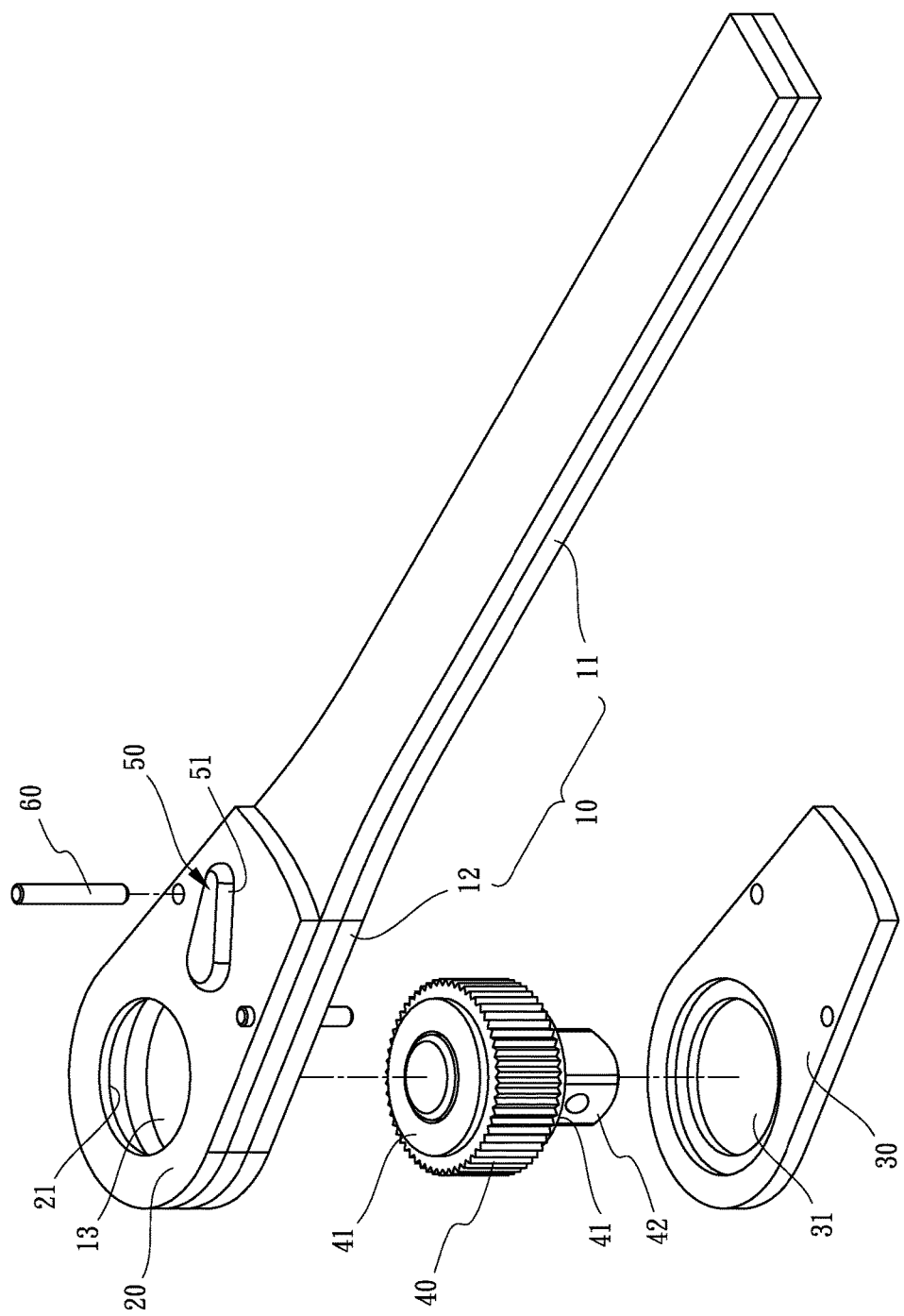
FIG. 2 is an exploded view of the coating structure of the present invention.
Figure 3:
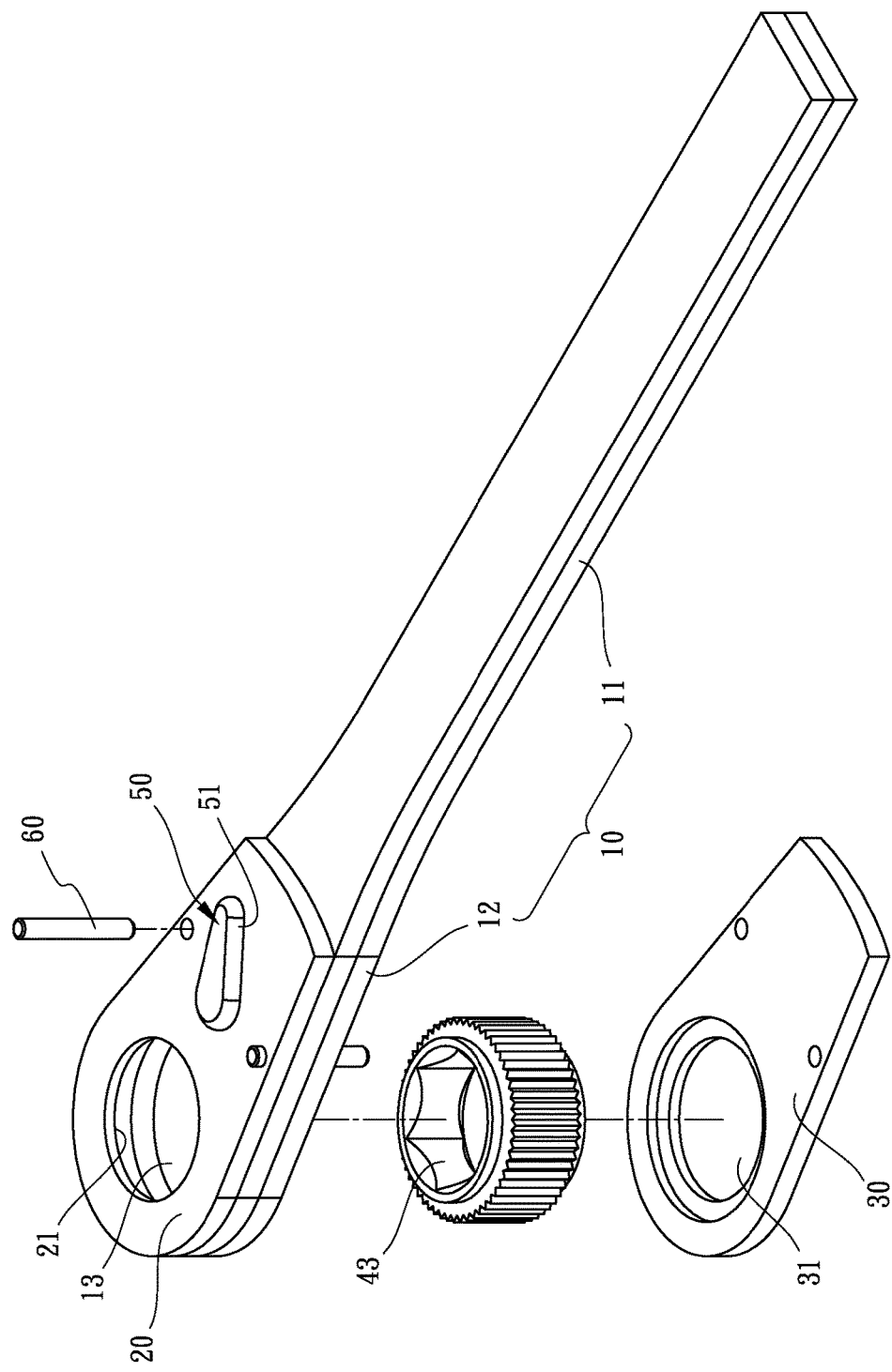
FIG. 3 is an exploded view of a second embodiment of a ratchet driving member of the coating structure of the present invention.
Figure 4:
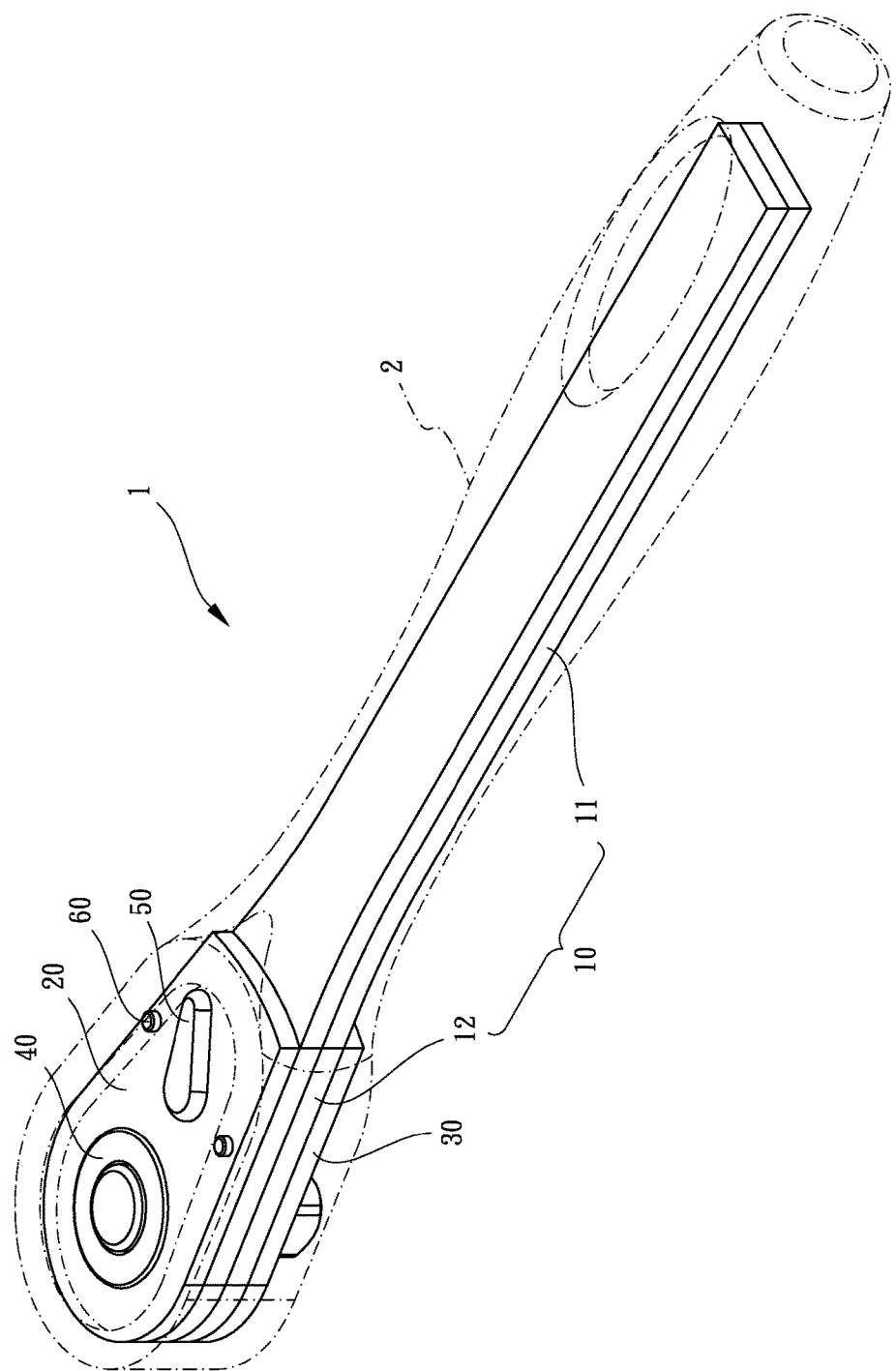
FIG. 4 is a perspective view of a tool body and an outer coating layer of the coating structure of the present invention.
Figure 5:
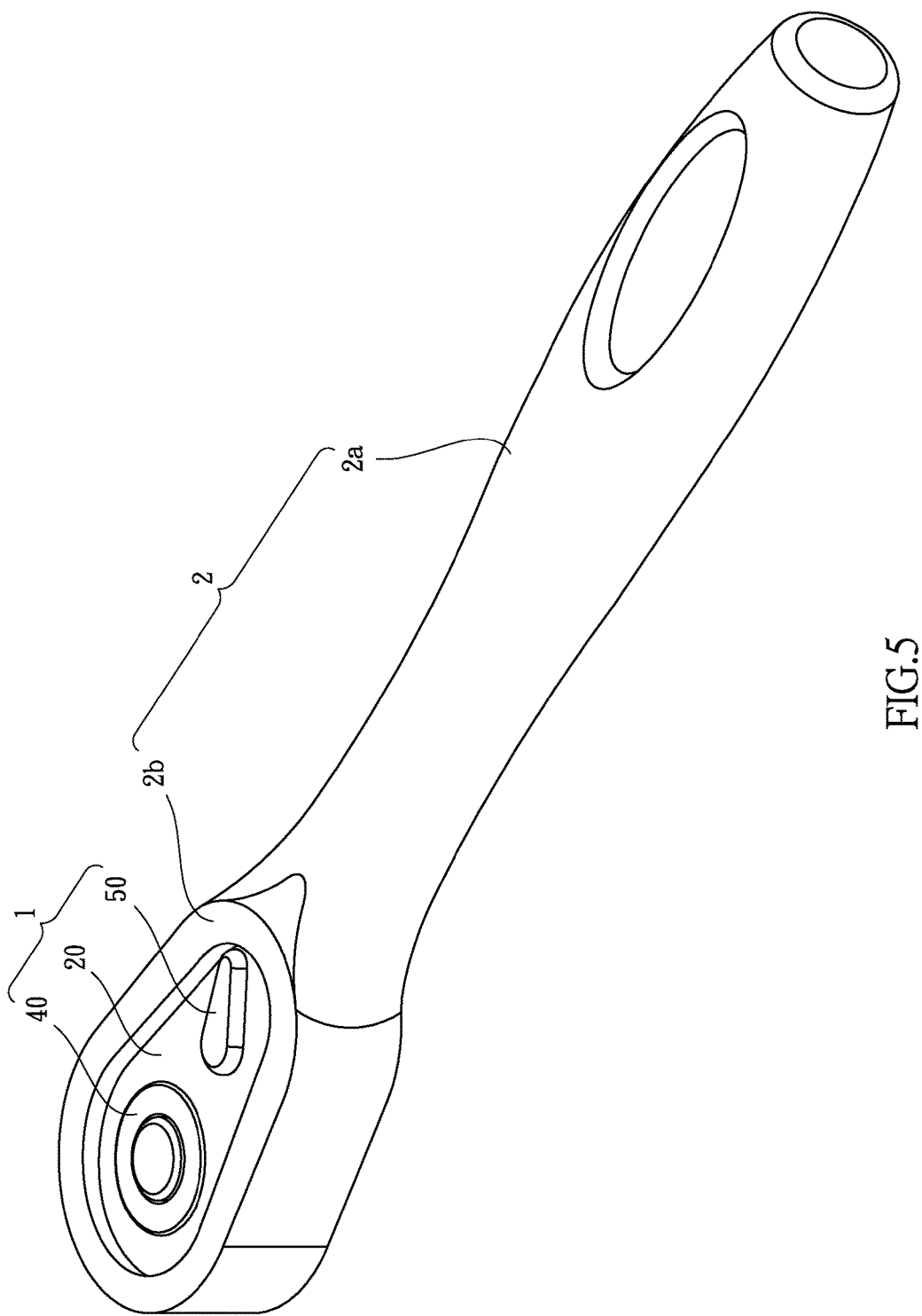
FIG. 5 is a perspective view of the coating structure of the present invention while the tool body and the outer coating layer are assembled together.

In FIGS. 1 to 5, two limiting convex portions 41 are respectively arranged at two ends of the ratchet driving member 40 in an axial direction. The two limiting convex portions 41 are respectively sleeved by the upper limiting hole 21 and the lower limiting hole 31. In FIGS. 2 and 3, the ratchet driving member 40 has two types. The first type is that a driving convex portion 42 is arranged at the ratchet driving member 40 and protruded from one end surface of the two limiting convex portions 41. The second type is that a driving sleeving hole 43 is arranged at the ratchet driving member 40 and passing through the ratchet driving member 40 and the two limiting convex portions 41. A base material is injected to cover on an outer surface of the tool body 1 to formed the outer coating layer 2 by a plastic injection molding machine. And a handle end 2a and an operating end 2b are formed at the coating layer 2 which correspond to the handle portion 11 and the driving portion 12 of the tool body 1 respectively. In addition, two ends of the at least one pin 60 are protruded from the surfaces of the upper limiting plate 20 and the lower limiting plate 30 and the coating layer 20 is covered two ends of the at least one pin 60 for fastening. Furthermore, the stirring member 50 has a stirring portion 51. The stirring portion 51 is exposed to an outer surface of the upper limiting plate 20.

In FIGS. 1 to 5, an outer coating 2 of the coating structure of the present invention is covered on the outer surface of the tool body 1 so that the appearance of the tool body 1 is not a critical concern, even the tool body 1 is composed of the base plate 10, the upper limiting plate 20, and the lower limiting plate 30 which are made by steel materials. Therefore, the steel forging process of the coating structure of the present invention, compared to general complicated steel forging process, is much simpler so as to save cost.

Figure 6:
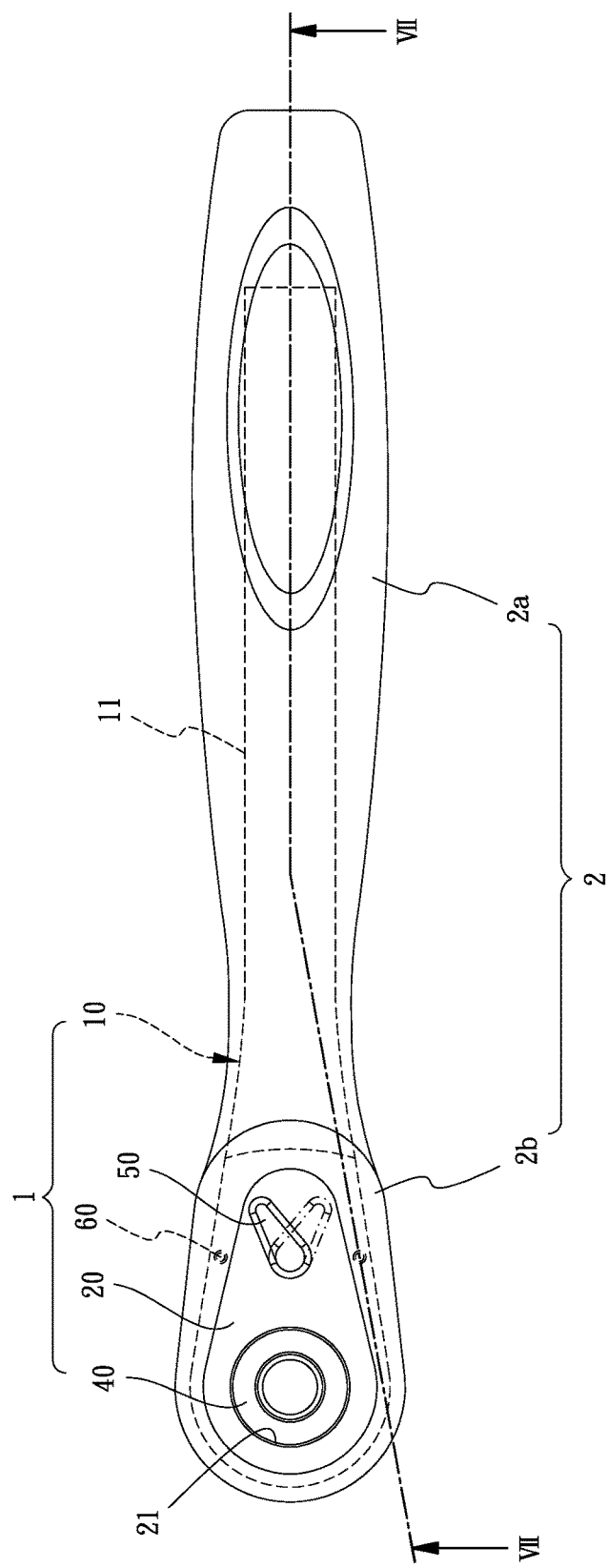
FIG. 6 is a plan view of the coating structure of the present invention while the tool body and the outer coating layer are assembled together.
Figure 7:
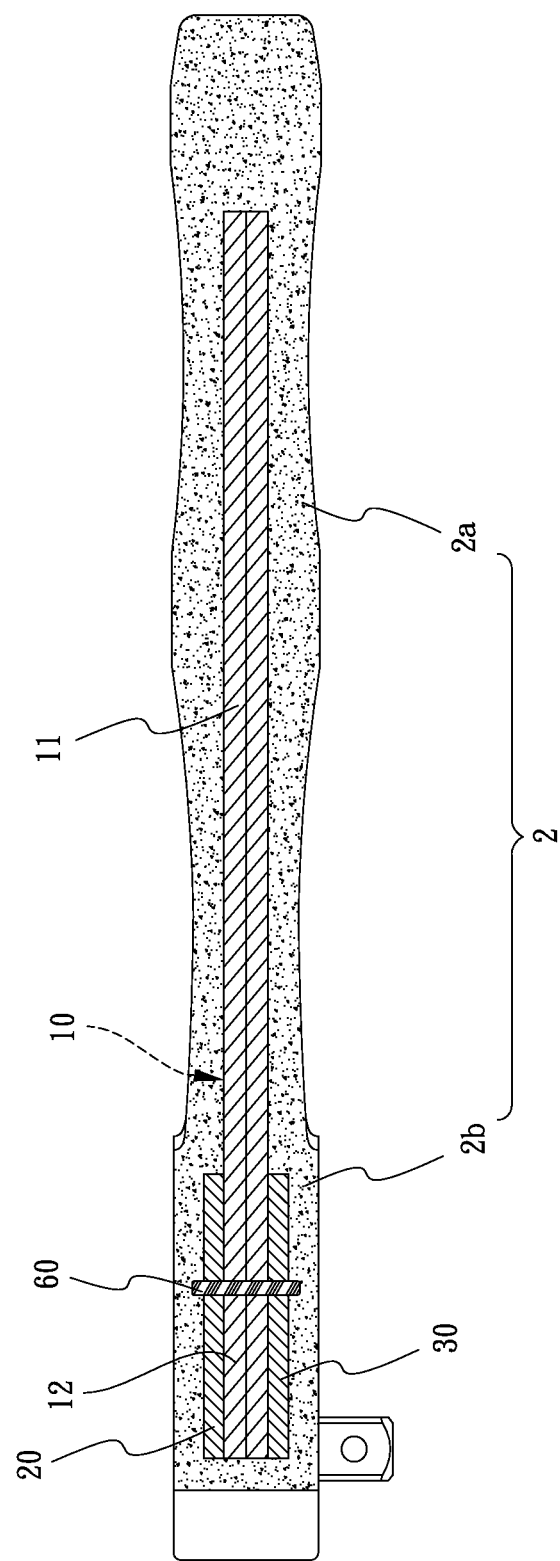
FIG. 7 is a cross-sectional view of FIG. 6 along line VII-VII.

In FIGS. 6 and 7, the is injected to cover on the outer surface of the tool body 1 to formed the outer coating layer 2 by the plastic injection molding machine so that the handle end 2a and the operating end 2b are formed at the coating layer 2 which correspond to the handle portion 11 and the driving portion 12 of the tool body 1 respectively. The handle end 2a is provided for a user to hold and the operating end 2b is covered and assembled to the surface of the upper limiting plate 20 located at the peripheral of the upper limiting hole 21 and the lower surface of the lower limiting plate 30 and simultaneously exposed to the ratchet driving member 40 and the stirring member 50. The driving direction and an idle rotation direction of the ratchet driving member 40 may be controlled by the stirring member 50 so that the ratchet driving member 40 may be assembled or disassembled to operate.

In FIG. 7, the at least one pin 60 is inserted between the driving portion 12 of the base plate 10 and the assembling structure of the upper limiting plate 20 and the lower limiting plate 30 and two ends of the at least one pin 60 are protruded from the surfaces of the upper limiting plate 20 and the lower limiting plate 30 so that the two ends of the at least one pin 60 which are covered the outer coating layer 2 and the tool body 1 are more firmly fastened to prevent the coating layer 2 from sliding while in operation. The operating quality may be increased.

Figure 8:
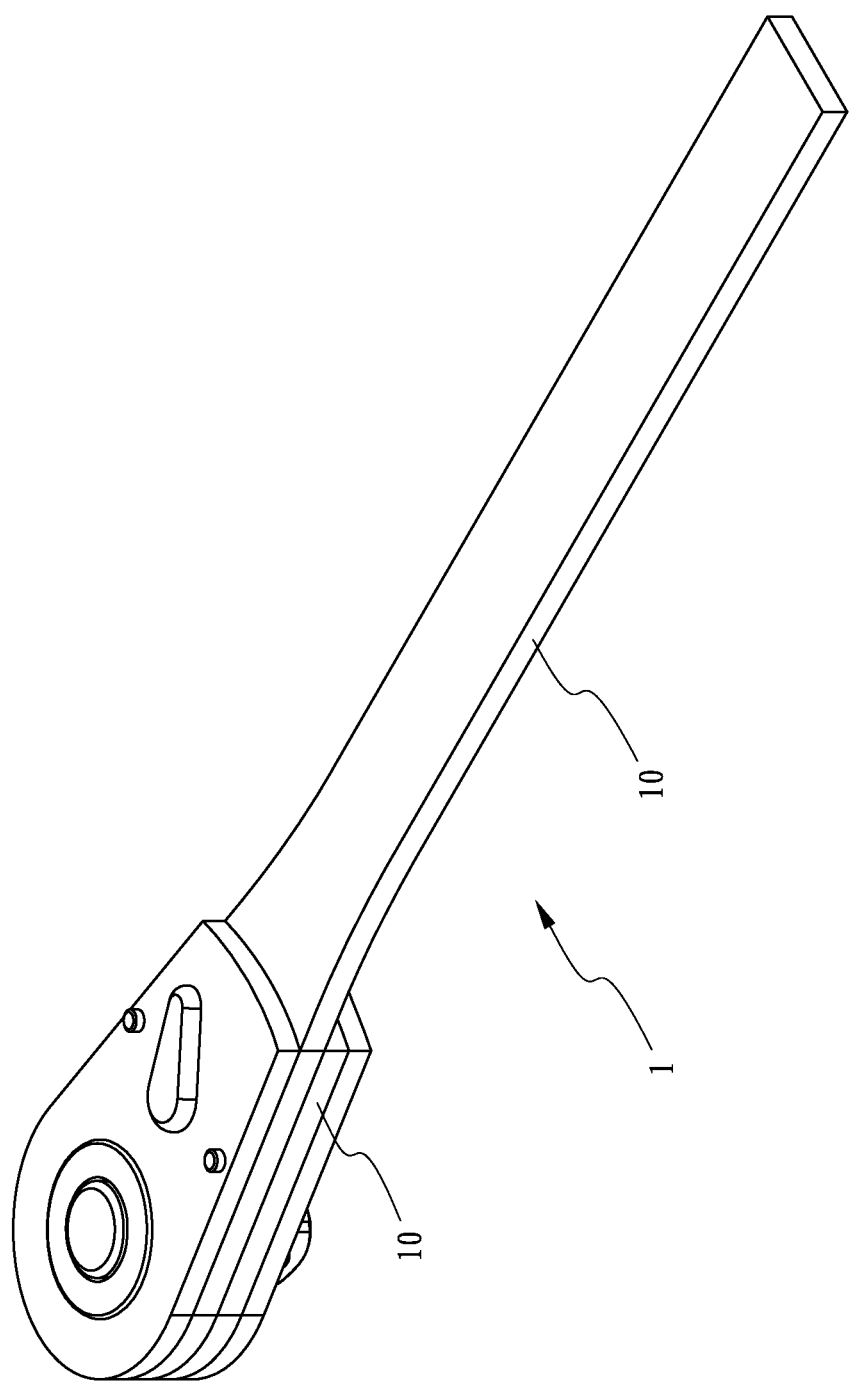
FIG. 8 is a perspective view of the tool body of the coating structure of the present invention while being reduced the material structure.
Figure 9:
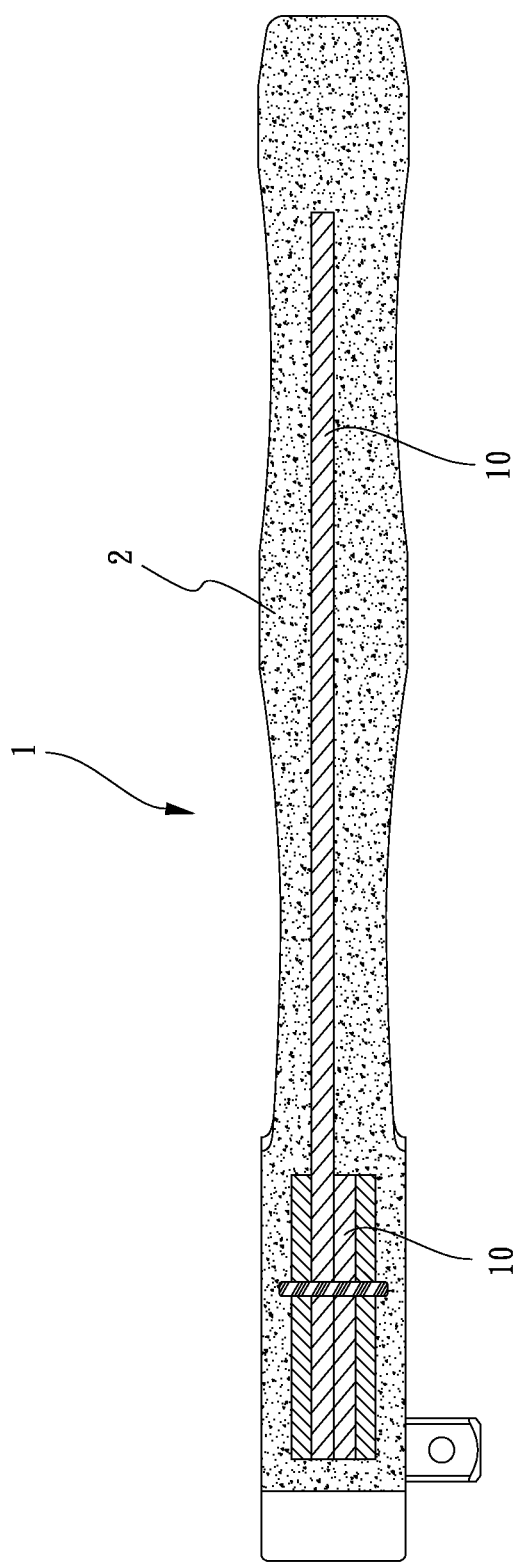
FIG. 9 is a cross-sectional view of FIG. 8 with the outer coating layer.

In FIGS. 8 and 9, the outer coating layer 2 is covered on the outer surface of the tool body 1 so that the appearance of the tool body 1 is not a critical concern. Unless the twisting load is influenced in operation, the length of the base plate 10 may be shortened and the cost of materials may be also decreased. Furthermore, the total cost may be also decreased.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A coating structure for forming a tool, comprising a tool body and an outer coating layer, wherein:
    the tool body includes at least one base plate, an upper limiting plate, a lower limiting plate, a ratchet driving member, a stirring member, and at least one pin, the base plate has a handle portion and a driving portion connected with one end of the handle portion, an accommodating groove is arranged at the driving portion, the upper limiting plate is arranged at an upper surface of the driving portion and has an upper limiting hole, the lower limiting plate is arranged at a lower surface of the driving portion and has a lower limiting hole, the upper surface of the driving portion is arranged above the lower surface thereof and opposite to each other, the ratchet driving member is arranged at the accommodating groove and pivoted at the upper limiting hole and the lower limiting hole, the stirring member is arranged between the ratchet driving member and the handle portion to control a driving direction of the ratchet driving member, the at least one pin is inserted at a peripheral of the accommodating groove located at the driving portion and passing through the upper limiting plate and the lower limiting plate for fastening, and two ends of the at least one pin are respectively protruded from a surface of the upper limiting plate and a surface of the lower limiting plate; and
    the outer coating layer is covered at the surface of the upper limiting plate located at a peripheral of the upper limiting hole, the surface of the lower limiting plate located at a peripheral of the lower limiting hole, and an outer surface of the base plate, the outer coating layer is also covered on two ends of the at least one pin protruding the surface of the upper limiting plate and the surface of the lower limiting plate for fastening.

2. The coating structure as claimed in claim 1, wherein two limiting convex portions are respectively arranged at two ends of the ratchet driving member in an axial direction, and the two limiting convex portions are respectively sleeved by the upper limiting hole and the lower limiting hole.

3. The coating structure as claimed in claim 2, wherein a driving convex portion is arranged at the ratchet driving member and protruded from one end surface of the two limiting convex portions.

4. The coating structure as claimed in claim 2, wherein a driving sleeving hole is passing through the ratchet driving member and the two limiting convex portions.

5. The coating structure as claimed in claim 1, wherein a base material is injected to cover on an outer surface of the tool body to formed the outer coating layer by a plastic injection molding machine, and a handle end and an operating end are formed at the coating layer corresponding to the handle portion and the driving portion of the tool body respectively.

6. The coating structure as claimed in claim 5, wherein the stirring member has a stirring portion, and the stirring portion is exposed to an outer surface of the upper limiting plate.

7. The coating structure as claimed in claim 1, wherein the stirring member has a stirring portion, and the stirring portion is exposed to an outer surface of the upper limiting plate.

* * * * *